United States Patent [19]

Floyd

[11] 4,260,727
[45] Apr. 7, 1981

[54] EPOXY-AMINE ADDUCTS FOR USE IN ELECTRODEPOSITION

[75] Inventor: Don E. Floyd, Robbinsdale, Minn.

[73] Assignee: Henkel Corporation, Minneapolis, Minn.

[21] Appl. No.: 59,933

[22] Filed: Jul. 23, 1979

[51] Int. Cl.³ .............................................. C08G 59/50
[52] U.S. Cl. .............................. 528/45; 260/29.2 EP; 260/29.2 TN; 204/181 C; 528/73; 528/121; 528/407; 564/443; 564/504
[58] Field of Search .................. 528/121, 45, 407, 73; 260/29.2 EP, 29.2 TN, 570.7, 584 C

[56] References Cited

U.S. PATENT DOCUMENTS

| | | | |
|---|---|---|---|
| 2,772,248 | 11/1956 | Lieberman et al. | 260/29.2 |
| 3,804,786 | 4/1974 | Sekmakas | 260/18 PT |
| 3,839,252 | 10/1974 | Bosso et al. | 260/29.2 EP |
| 3,922,253 | 11/1975 | Jerabek et al. | 260/77.5 TB |
| 3,935,087 | 1/1976 | Jerabek et al. | 204/181 |
| 4,031,050 | 6/1977 | Jerabek | 260/29.2 TN |
| 4,101,486 | 7/1978 | Bosso et al. | 260/29.2 TN |
| 4,134,865 | 1/1979 | Tominaga | 260/18 PN |

*Primary Examiner*—Earl A. Nielsen
*Attorney, Agent, or Firm*—Forrest L. Collins; Patrick J. Span

[57] ABSTRACT

The present invention deals with unique substituted ammonium compounds for use in cationic electrodeposition processes.

9 Claims, No Drawings

EPOXY-AMINE ADDUCTS FOR USE IN ELECTRODEPOSITION

BACKGROUND OF THE INVENTION

1. Field of the Invention

The present invention relates to electrodeposition such as is practiced in the automotive industry.

2. Description of the Art Practices

Electrodeposition is defined as the process of depositing a film forming material through the use of electrical potential. There are two forms of electrodeposition. The first and most widely known and used form is that of anodic deposition wherein the negatively charged film forming material is attracted to the anode where the negative charge is removed and the material is plated out. The second form of electrodeposition is known as cationic deposition wherein the film forming material contains a positively charged group which is attracted to the cathode. At the cathode the positive charge of the film forming material is neutralized by the electrons flowing through the electrode and the film is deposited thereon. In either the case of cationic or anodic electrodeposition a second cure, usually thermal, is employed to fix the film forming material onto the desired surface. In either instance, of course, the substrate to which the film is applied was the electrode involved in the reaction.

Considerable discussion of the subject of both cationic and anodic electrodeposition is found in THE CHEMISTRY OF BINDERS FOR ELECTRODEPOSITION found in PROGRESS IN ORGANIC COATINGS, 7(1979) Pages 1–77. Specific systems which discuss cationic electrodeposition are found in U.S. Pat. No. 3,922,253 issued Nov. 25, 1975 to Jerabek et al.

U.S. Pat. No. 3,637,618 issued Jan. 25, 1972 to May discloses compositions comprising a mixture of a curable unsaturated polyester which is formed from a normally liquid polyepoxide and an ethylenically unsaturated organic carboxylic acid and a second normally solid polymeric material possessing a plurality of epoxy groups. U.S. Pat. No. 3,876,518 issued Apr. 8, 1975 to Borden et al describes amine derivatives of acrylated epoxidized soybean oil which may be cured by radiation. Polyepoxide products which are formed from a blend of an epoxide resin and a polyacrylate or polymethacrylate and which are stated to have rapid low cure properties with polyamines are described in U.S. Pat. No. 4,051,195 issued Sept. 25, 1977 to McWhorter.

In U.S. Pat. No. 3,617,458 issued to Brockman Nov. 2, 1971 there are described cross-linkable coating compositions derived from an unsaturated compound containing a carboxylic acid, an epoxidized material and a compound which contains a pendant amine group. Bosso et al in U.S. Pat. No. 3,839,252 issued Oct. 1, 1974 describes compositions which are stated to be nongelled water-dispersible epoxy resins containing oxyalkylene groups. U.S. Pat. No. 3,804,786 issued to Sekmakas issued Apr. 16, 1974 describes water-dispersible cationic polyurethane resins containing diglycidyl ether resins.

U.S. Pat. No. 3,935,087 issued to Jerabek et al on Jan. 27, 1976 describes coating compositions with good throwing power comprising epoxy resins with blocked isocyanates and amine salts. U.S. Pat. No. 3,963,663 issued to Sekmakas June 15, 1976 describes corrosion resistant thermosetting resins prepared by combining the water-dispersible foam of an acid and an amine resin and a phenolic resin McGinniss in U.S. Pat. No. 3,975,251 issued Aug. 17, 1976 describes heat curable coating compositions containing a polymer having pendant amine groups.

Marchetti et al in U.S. Pat. No. 3,975,250 issued Aug. 17, 1976 describes electrodeposition compounds containing mono-substituted urea and urethane linkages. The compounds are also stated to contain epoxy and acid solubilized amine groups. Cathodically depositable coating compositions are described by Bachmann et al in U.S. Pat. No. 3,729,435 issued Apr. 24, 1973. Jerabek in U.S. Pat. No. 4,031,050 issued June 21, 1977 describes cationic electrodepositable compositions containing a blocked isocyanate and the acid salt of an adduct of amine and a polyepoxide.

Throughout the specification and claims, percentages and ratios are by weight and temperatures are in degrees of Celsius unless otherwise indicated.

SUMMARY OF THE INVENTION

The present invention describes compounds which are useful for manufacturing products useful in cationic electrodeposition including the reaction product of:

(a) A difunctional epoxy compound having an average molecular weight of from about 342 to about 2,000; and, (b) A primary amine having a molecular weight of from about 73 to about 280, such that the combined molecular weight of (a) and (b) is from about 830 to about 5,600 in a mole ratio of the epoxy compound to the primary amine of from about 1.8:3 to about 2.4:3 respectively.

DETAILED DESCRIPTION OF THE INVENTION

The present invention as previously noted describes compositions of matter which are useful in forming cationic compounds which may be used in cationic electrodeposition. The compositions of the present invention are useful in that after having been attracted to a piece functioning as a cathode that the film may then be cured by conventional chemical means to form a tough water resistent flexible coating.

The first component to be discussed in the present invention is that of the difunctional epoxy compound. By difunctional epoxy compound it is meant that component (a) of the present invention will contain at least two oxirane groups capable of forming a bond with a reactant material such as an amine. It is, of course, included within the scope of the present invention that the difunctional epoxy compound may contain an epoxy functionality which has previously been reacted such as condensation with itself provided that at least two unreacted oxirane structures are still present in the molecule.

Basically two specific groups of epoxy compounds are highly desirable compounds for use in the present invention. These materials which correspond to Bisphenol A and hydrogenated Bisphenol A epoxides are shown below:

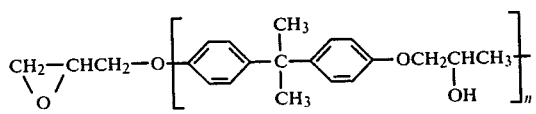

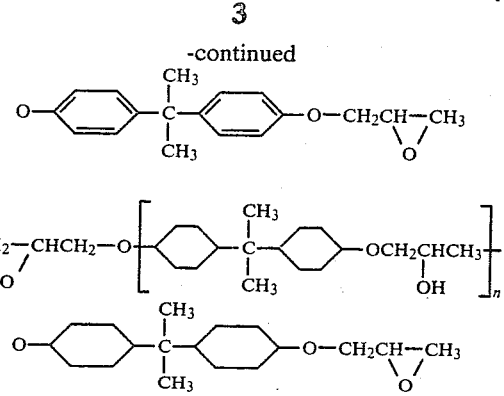

In the above formulas it is preferred that n is less than 2 preferably having a value of from 0 to 1, most preferably 0.

To obtain the proper degree of dispersion it is necessary that the average molecular weight of the difunctional epoxy compound be between about 342 and about 2,000, preferably from about 380 to about 500.

The second component in the present invention is a primary amine having a molecular weight of from about 73 to about 280, preferably 80 to 275. Suitable examples of such primary amines include those fatty amines having from 4 to 18 carbon atoms specifically including butyl through stearyl amine and preferably the corresponding unsaturated amines. Also useful herein are aromatic amines and cycloaliphatic amines such as aniline and cyclohexylamine. Preferably the amine contains from about 8 to about 18 carbon atoms therein to provide sufficient water resistance in the cured coating.

The reaction product of the present invention is formed by reacting the difunctional epoxy compound and the fatty primary amine in a mole ratio of from about 1.8:3 to about 2.4:3, preferably from about 1.9:3 to about 2.1:3 and most preferably 2:3 respectively. This reaction is conducted in accordance with standard industry practices and thus no particular description is given of this step. It should be noted that upon properly forming the reaction product that the following structure is obtained:

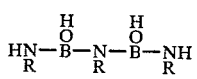

where N is the amine and B is the difunctional epoxy compound. It is noted from this diagram that the amine occupies both the center and the extreme portions of the reaction product. The amine in the center of the formula is fully reacted and is thus a tertiary amine with a fatty tail R whereas the two terminal amines are now secondary amines each containing one hydrogen atom still available for reaction and a fatty tail R. The hydroxyl groups shown on each B are from the opening of the oxirane ring and are of course available for any reactant with which a hydroxyl would normally react.

In practice the invention is highly useful in that both the hydroxyl and the remaining secondary amine functionalities allow a high degree of cross-linking with an isocyanate as is later described. The positioning of the central tertiary amine in the above structure is also quite useful in that the tertiary amine is the one which is neutralized as hereinafter described. The central positioning allows the charge distribution in the molecule such that the film will be evenly deposited upon the piece to be coated.

As mentioned above, the reaction product of the present invention is primarily useful in cationic electrodeposition wherein the tertiary amine is reacted with an acidic material such as lactic or acetic acid or their anhydrides in an amount sufficient to substantially neutralize the reaction product giving a substituted ammonium salt, prior to the electrocoating. This technology has also been amply described in the art and is thus not particularly described in this patent.

The present invention as noted above is most conveniently utilized as the substituted ammonium salt of the reaction product. It is also highly desirable that a fully blocked isocyanate be utilized with the neutralized reaction product to effect cross-linking, thus firmly adhering the coating to the piece. Suitable examples of isocyanates are as follows.

Suitable polyisocyanates include ethylene diisocyanate, trimethylene diisocyanate, hexamethylene diisocyanate, propylene-1,2-diisocyanate, ethylidene diisocyanate, cyclopentylene-1,3-diisocyanate, the 1,2-, 1,3- and 1,4-cyclohexylene diisocyanates, the 1,3-, and 1,4-phenylene diisocyanates, polymethylene polyphenylene-isocyanates, the 2,4-, and 2,6-toluene diisocyanates, the 1,3-, and 1,4-xylylene diisocyanates, bis(4-isocyanatophenyl)methane, 4,4'-diphenyl-propane diisocyanates, bis(2-isocyanatoethyl) carbonate, 1,8-diisocyanatopmethane, 1-methyl-2,4-diisocyanato-cyclohexane, the chlorophenylene diisocyanates, naphthalene-1,5-diisocyanate triphenylmethane-4, 4', 4''-triisocyanate, isopropylbenzene-alpha-4-diisocyanate, 5-6,-bicyclo[2.2.2]hept-2-ene diisocyanate, 5,6-diisocyanatobutylbicyclo [2.2.11]hept-2-ene and similar polyisocyanates.

Of particular interest in the present invention are trimethyl hexamethylene diisocyanate available from VEBA, DDI ® 1410 aliphatic C-36 diisocyanate available from the Henkel Corporation, (generally diisocyanates having from 12 to 40 carbons in the aliphatic radical may be used in the present invention), toluene diisocyanate available from Allied Chemical, isophorone diisocyanate available from VEBA and Desmodur N an aliphatic triisocyanate from Mobay. Desmodur N is more particularly defined as the triisocyanate adduct of 3 moles of hexamethylene diisocyanate and water having an isocyanate equivalent weight of 191 grams. Other adducts or prepolymers of the polyisocyanate include Desmodur L and Mondur CB which are the adducts of toluene diisocyanate. The foregoing materials have an isocyanate equivalent weight of approximately 250 grams.

The amount of the isocyanate utilized in the present invention will be that amount theoretically necessary on an equivalent basis to cure from 90 to 110% of the available hydroxyl and amine groups remaining on the reaction product, preferably from about 95% of those necessary. Of course, in the coating art it is more desirable to leave unreacted isocyanate groups than to have unreacted hydroxyl or amine groups. This is due to the fact that the unreacted hydroxyl groups really provide nothing in the form of stability in the coating whereas the amine groups if unreacted may chalk thereby discoloring the coating. If unreacted isocyanate radicals are present, however, these materials will necessarily moisture cure and thus cross-link from one isocyanate to another thus providing a film which is more stable than one in which the isocyanate is not present in sufficient quantity.

In order to utilize the isocyanate in an aqueous cationic deposition bath and such that the product in any event does not prematurely gel, it is necessary as previously noted that the isocyanate be fully blocked. By blocking it is meant that any particular agent which will react with the isocyanate so that the isocyanate is not free to react with the amine hydrogen or the hydroxyl of the reaction product but yet will disassociate itself leaving the isocyanate radical free to react is required. Suitable examples of blocking agents useful in the present invention include aliphatic, cyclo-aliphatic, aromatic, alkyl, monoalcohols and phenolic compounds. Specifically desirable are lower aliphatic alcohols, such as methyl, ethyl, chloroethyl, propyl, butyl, amyl, hexyl, heptyl, octyl, nonyl, 3,3,5-trimethylhexanol, decyl, and lauryl alcohols and the like. The cycloaliphatic alcohols are for example cyclopentanol, cyclohexanol, and the like; the aromatic alkyl alcohols, such as phenylcarbinol, methylphenylcarbinol, ethylene glycol monoethyl ether, ethylene glycol monobutyl ether, and the like. The phenolic compounds useable as blocking agents are materials such as phenol itself, substituted phenols in which the substituents do not adversely effect the coating operations. Examples include cresol, xylenol, nitrophenol chlorophenol, ethyl phenol, t-butyl phenol, and 2,5-di-t-butyl-4-hydroxy toluene. Minor amounts of higher molecular weight, relatively non-volatile monoalcohols may be used, if desired, to serve as plasticizers in the coatings provided by this invention.

Additional blocking agents include tertiary hydroxylamines such as diethylethanolamine and oximes such as methyl ethyl ketone oxime, acetone oxime and cyclohexanone oxime. Use of oximes is particularly desirable because polyisocyanates blocked with oximes uncap at relatively low temperatures without the need for externally added urethane forming catalyst such as the tin catalyst described below.

In particular the highly desirable blocking agents utilizable in the present invention are butyl alcohol, 2-hydroxyethyl ether of ethanol, 2-ethylhexanol and mixtures thereof.

As previously described the compositions of the present invention when utilized in a cationic coating provide colorless compounds having great flexibiltiy and high water resistance.

In use the neutralized reaction product and a sufficient amount of the blocked isocyanate are added at a combined weight of 7% to 20% preferably 8% to 18% by weight, in an aqueous electrodeposition bath. The piece to be coated functions as the cathode and the action of the neutralized reaction product is sufficient to carry any pigments included and the blocked isocyanate to the piece. A heat cure following deposition fixes the pigment through unblocking the isocyanate which then cures the hydroxyl and amine groups on the piece.

The following are examples of the present invention.

EXAMPLE I

A reaction product is prepared in accordance with the present invention by heating a mixture of 0.4 mole of oleyl amine (106.8 grams) and 0.2 mole of Epon 828 (76.0 grams), which is an aromatic epoxy compound having an epoxide equivalent value of from about 180 to 195 (average 190) and a viscosity of from about 100 to 160 poise at 25 degrees C., by adding these materials to a 3 necked flask at 150 degrees C. under a nitrogen atmosphere for one hour with constant stirring.

This reaction product is then utilized in the amount of 155.4 grams, by dissolving it in 62.2 grams of methyl isobutyl ketone at 50 to 60 degrees C. and then to this solution is added 4.25 grams of dibutyl tin dilaurate and 63.24 grams of a blocked isocyanate prepared by the reaction of toluene diisocyanate with 2-hydroxyethyl ether of ethanol. This blocked isocyanate is prepared from one equivalent of an 80:20 mixture of 2,4- and 2,6-toluene diisocyanate and one equivalent and a 10% excess of (99 grams) dry 2-hyroxyethyl ether of ethanol with two drops of dibutyl tin dilaurate. The purpose of the dibutyl tin dilaurate is as a catalyst for the cross-linking by the isocyanate upon its being released from the blocking agent. The 2-hydroxyethyl ether of ethanol is slowly dropped into a stirred mixture of the reagents while the temperature is maintained at 55–75 degrees. Heating was continued at approximately 65 degrees C. for an additional hour to obtain a colorless viscous liquid.

The mixture of the blocked isocyanate and the reaction product is dispersed by adding 36 grams of 85% lactic acid and 2,876 grams of deionized water with stirring.

EXAMPLE II

The reaction product is next prepared utilizing a ratio of 3 moles of oleyl amine and 2 moles of Epon 828 as previously described in Example I. The weights employed are 208 grams of the oleyl amine and 197.6 grams of the Epon 828.

208 grams of the reaction product are dissolved in 83.2 grams of warm methyl isobutyl ketone at 50–60 degrees C. and to the solution is added 5.6 grams of the dibutyl tin dilaurate and 92 grams of the toluene diisocyanate blocked with 2 ethylhexanol.

This particular blocked isocyanate is the material described in Example I with the exception that it has been heated with 1 equivalent including a 10% excess of 2-ethylhexanol and 3 to 4 drops of dibutyl tin dilaurate at 70 degrees Centigrade plus or minus 5 degrees C. for one hour.

The mixture of the blocked isocyanate and the reaction product is then dispersed by adding 24 grams of glacial acetic acid and thereafter adding 3,708 grams of deionized water with good stirring.

EXAMPLE III

In this example the reaction product of Example II is combined with the blocked isocyanate of Example I.

That is, 208 grams of the reaction product prepared from the 3 moles of oleyl amine and 2 moles of the Epon 828 as in Example II is added to 83.2 grams of methyl isobutyl ketone to dissolve the resin utilizing slight warming. Then 74.4 grams of the toluene diisocyanate blocked with the 2-hydroxyethyl ether of ethanol is added along with 5.4 grams of dibutyl tin dilaurate. This mixture is dispersed by adding with good stirring 42.4 grams of 85% aqueous lactic acid and 3,901 grams of deionized water.

EXAMPLE IV

The cationic dispersions of Examples I, II and III are each in turn placed in electrodeposition cells made by Ransburg and identified as Ransplater Model 600 AA. This device has been modified by reversing the polarity so that it is a cationic coating apparatus rather than the anionic apparatus as was originally intended. The coatings are effected by applying direct current to steel panels functioning as a cathode (piece) and applying direct current. The coated panels were rinsed with water, air dried for a short time and then baked at 175 degrees C. for 30 minutes to bring about a curing of the coating.

Table I below indicates the properties of the coatings of Examples I, II and III.

| Coating | Applied Voltage | Time Interval | Coating Thickness | Reverse Impact Inch-lbs | Pencil Hardness | Overnite Spot Tests | | |
|---|---|---|---|---|---|---|---|---|
| | | | | | | $H_2O$ | 20% NaOH | 37% $H_2SO_4$ |
| Example I | 100 | 60 sec. | 0.5 mil | >80 | B | OK | OK | OK |
| Example II | 100 | 60 sec. | 0.4 mil | >80 | HB | OK | OK | OK |
| Example III | 100 | 60 sec. | 0.9 mil | >80 | B | OK | OK | OK |

As previously noted the voltage is applied as direct current. The pencil hardness test refers to the ability of the coating to withstand scratching by a pencil of the hardness shown in the table. The overnight spot tests are resistance to the various solvents as indicated obtained by applying a drop of the solvent and allowing it to stand overnight for a period of about sixteen hours on the surface of the coating.

The results of the testing shows the cured compositions to be exemplary. Substantially similar results are obtained by varying the compositions within the parameters previously shown.

What is claimed is:

1. The reaction product of:
   (a) A difunctional epoxy compound having an average molecular weight of from about 342 to about 2,000; and,
   (b) A primary mono amine having from about 8 to 18 carbon atoms such that the combined molecular weight of (a) and (b) is from about 830 to about 5,600 in a mole ratio of the epoxy compound to the primary amine of from about 1.8:3 to about 2.4:3 respectively.

2. The composition of claim 1 wherein the primary amine is an aliphatic compound having from 8 to 18 carbon atoms.

3. The reaction product of claim 1 wherein the starting material for the epoxy compound is selected from the group consisting of Bisphenol A and saturated Bisphenol A and mixtures thereof.

4. The reaction product of claim 3 wherein the epoxy is based upon Bisphenol A.

5. The reaction product of claim 3 wherein the epoxy is based upon saturated Bisphenol A.

6. The reaction product of claim 2 wherein the primary amine is oleyl amine.

7. The reaction product of claim 1 which has been neutralized with a member selected from the group consisting of lactic and acetic acids and mixtures thereof.

8. The reaction product of claim 1 wherein the reactive equivalent ratio of (a):(b) is from about 1.9:3 to about 2.1:3.

9. The reaction product of claim 7 additionally containing a fully blocked polyisocyanate compound.

* * * * *